(12) United States Patent
Fang

(10) Patent No.: US 7,673,828 B1
(45) Date of Patent: Mar. 9, 2010

(54) PEPPER MILL

(75) Inventor: Ming-Huei Fang, Tainan (TW)

(73) Assignee: Yienn Lih Enterprise Co., Ltd. (TW)

( * ) Notice: Subject to any disclaimer, the term of this patent is extended or adjusted under 35 U.S.C. 154(b) by 0 days.

(21) Appl. No.: 12/393,204

(22) Filed: Feb. 26, 2009

(51) Int. Cl.
*A47J 42/38* (2006.01)
(52) U.S. Cl. ..................... 241/169.1; 241/168
(58) Field of Classification Search ............... 241/168, 241/169.1
See application file for complete search history.

(56) References Cited

U.S. PATENT DOCUMENTS 6,966,510 B2 * 11/2005 Pai .......................... 241/169.1
7,328,865 B1 * 2/2008 Mills ....................... 241/169.1

* cited by examiner

*Primary Examiner*—Faye Francis
(74) *Attorney, Agent, or Firm*—Sheridan Ross P.C.

(57) ABSTRACT

A peppermill includes a receiving unit that surrounds an axis and that defines a receiving space for receiving peppercorns, a grinding unit that includes a coupling shaft disposed rotatably in the receiving space and having a shaft hole extending therethrough along the axis, and that is operable for grinding the peppercorns to result in ground pepper, and a closure unit that includes a connecting rod extending movably through the shaft hole along the axis, and a closure member secured to the connecting rod and disposed under the grinding unit. Movement of the connecting rod results in corresponding movement of the closure member between a closed position for blocking discharge of the ground pepper through a discharge end of the receiving unit, and an opened position for permitting discharge of the ground pepper through the discharge end.

10 Claims, 7 Drawing Sheets

PEPPER MILL

BACKGROUND OF THE INVENTION

1. Field of the Invention

The invention relates to a grinder, more particularly to a pepper mill.

2. Description of the Related Art

A conventional pepper mill generally has a receiving unit for receiving peppercorns therein, and a grinding unit disposed in a bottom part of the receiving unit for grinding the peppercorns into ground pepper. The grinding unit generally includes a stationary annular outer grinding seat, and an inner grinding seat disposed within the outer grinding seat, cooperating with the outer grinding seat to define a grinding opening therebetween, and rotatable relative to the outer grinding unit for grinding the peppercorns into ground pepper discharged through the grinding opening.

However, after use, when the conventional peppermill is put on a cabinet or a dining table, a portion of residual ground pepper will fall out of the conventional pepper mill and scatter on the cabinet or the dining table, thereby making the cabinet or the dining table untidy.

SUMMARY OF THE INVENTION

Therefore, the object of the present invention is to provide a pepper mill capable of preventing residual ground pepper from falling out therefrom.

Accordingly, a pepper mill of the present invention comprises a hollow receiving unit, a grinding unit, and a closure unit. The receiving unit surrounds an axis, defines a receiving space for receiving peppercorns, and has a discharge end for discharging ground pepper. The grinding unit includes a coupling shaft that is disposed rotatably in the receiving space and that has a shaft hole extending therethrough along the axis. The grinding unit is operable for grinding the peppercorns in the receiving space to result in the ground pepper. The closure unit includes an elongated connecting rod that extends movably through the shaft hole along the axis, and a closure member that is secured co-movably to the connecting rod, and that is disposed under the grinding unit. Movement of the connecting rod along the axis results in corresponding movement of the closure member relative to the grinding unit between a closed position for blocking discharge of the ground pepper through the discharge end of the receiving unit, and an opened position for permitting discharge of the ground pepper through the discharge end of the receiving unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
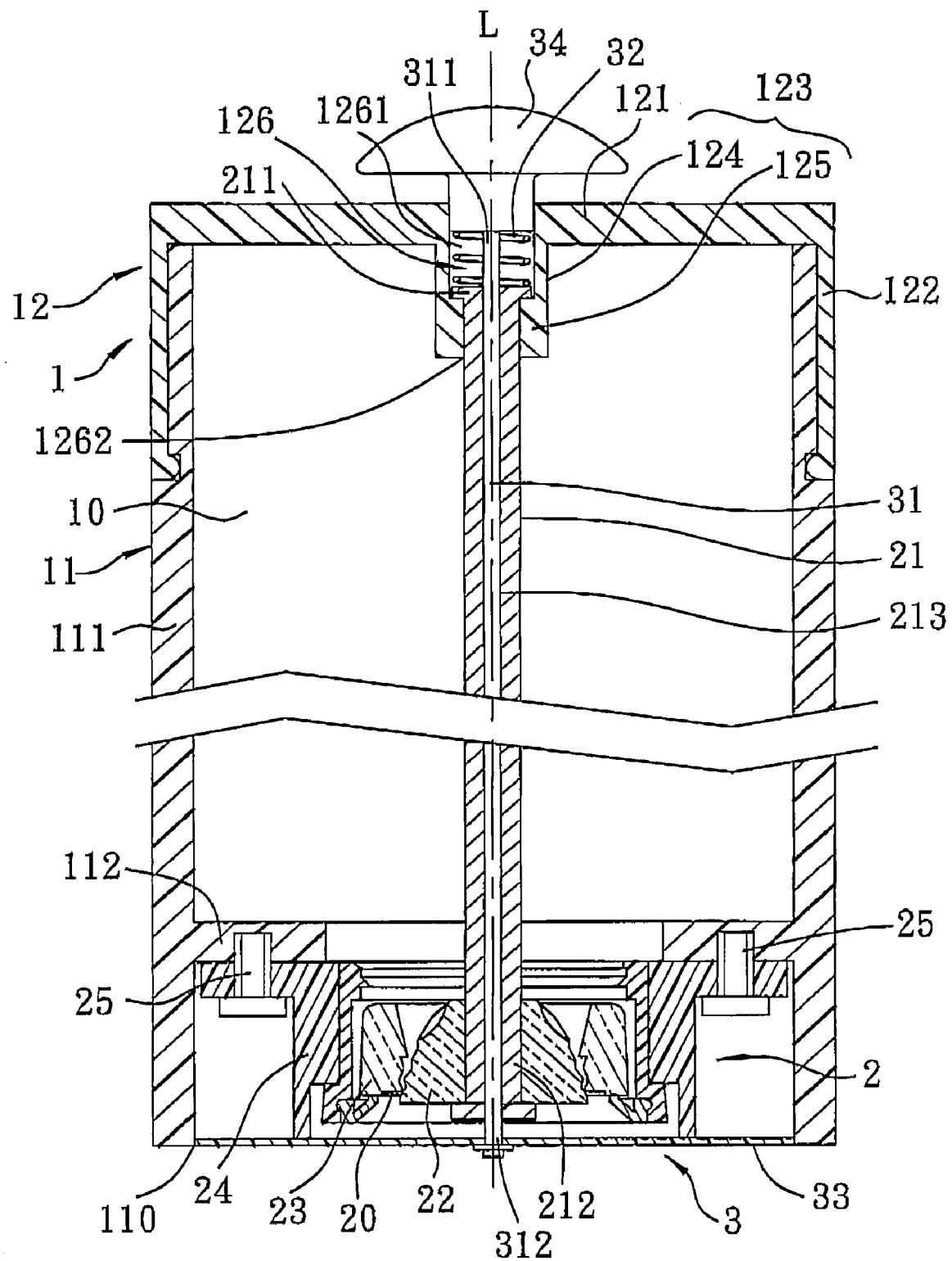
FIG. 1 is a fragmentary sectional view of a first preferred embodiment of a pepper mill according to the invention, illustrating a closure member at a closed position.

Before the present invention is described in greater detail, it should be noted that like elements are denoted by the same reference numerals throughout the disclosure.

Figure 2:
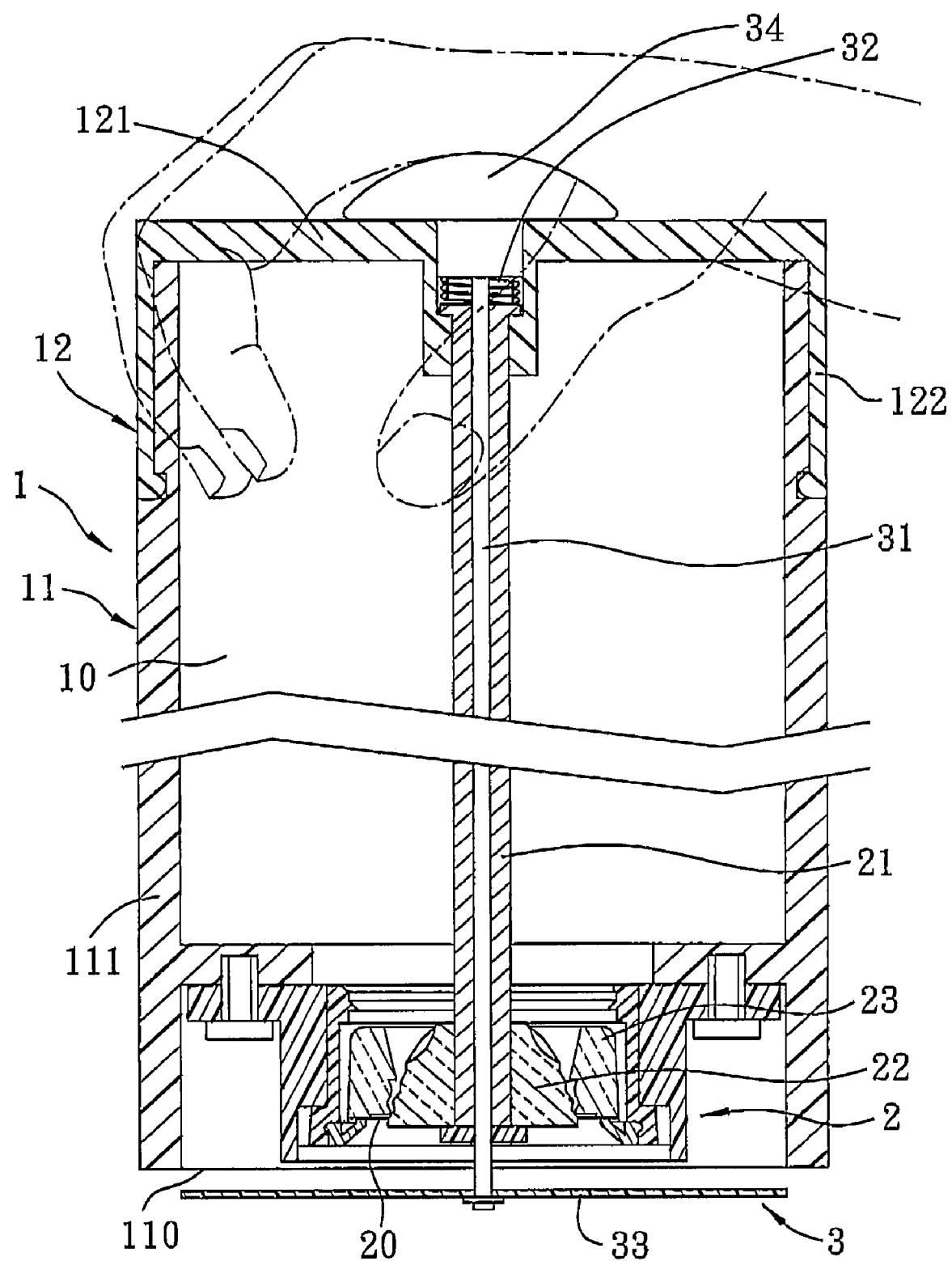
FIG. 2 is a view similar to FIG. 1, but illustrating the closure member at an opened position.

As shown in FIGS. 1 and 2, the first preferred embodiment of a pepper mill according to the present invention comprises a receiving unit 1, a grinding unit 2, and a closure unit 3.

The receiving unit 1 includes a container body 11 and a cover member 12.

The container body 11 includes a surrounding container well 111 that surrounds an axis (L) and that has a discharge end 110, and an annular mounting wall 112 that projects radially and inwardly from the surrounding container wall 111.

The cover member 12 is coupled co-rotatably to one end of the container body 11 opposite to the discharge end 110 of the container body 11, and cooperates with the container body 11 to define a receiving space 10 for receiving peppercorns (not shown). The cover member 12 has a cover wall 121, a surrounding wall 122 extending parallel to the axis (L) from a periphery of the cover wall 121 and coupled rotatably to the surrounding container wall 111 of the container body 11, and a stepped coupled wall 123 extending parallel to the axis (L) from a central part of the cover wall 121, extending in a direction toward the discharge end 110 of the container body 11, and having a coupling well section 124 that is connected to the cover wall 121, and an abutting wall section 125 that extends from the coupling well section 124 away from the cover wall 121, that has an internal diameter smaller than that of the coupling wall section 124, and that cooperates with the cover wall 121 and the coupling wall section 124 to define a retaining hole 126. In this embodiment, the retaining hole 126 has an upper hole portion 1261 within the coupling wall section 124 of the coupling wall 123, and a lower hole portion 1262 within the abutting wall section 125 of the coupling wall 123, and has a rectangular cross-section.

The grinding unit 2 is operable for grinding the peppercorns in the receiving space 10 to result in ground pepper discharged through the discharge end 110 of the container body 11 of the receiving unit 1. In this embodiment, the grinding unit 2 includes an elongated hollow coupling shaft 21 with a rectangular cross-section, and having opposite top and bottom shaft portions 211, 212. The top shaft portion 211 engages the lower hole portion 1262 of the retaining hole 126 in the cover member 12, such that the coupling shaft 21 is coupled co-rotatably to the cover member 12. The coupling shaft 21 further has a shaft hole 213 extending therethrough along the axis (L). The grinding unit 2 further includes an inner grinding seat 22 coupled co-rotatably to the bottom shaft portion 212 of the coupling shaft 21, a stationary outer grinding seat 23 surrounding the inner grinding seat 22 and cooperating with the inner grinding seat 22 to define a grinding opening 20 therebetween, a sleeve seat 24 surrounding the outer grinding seat 23, and a pair of screws 25 disposed for fastening the sleeve seat 24 on the annular mounting wall 112 of the container body 11. As such, rotation of the cover member 12 drives the coupling shaft 21 to rotate together with the inner grinding seat 22 relative to the outer grinding seat 23 for grinding the peppercorns in the receiving space 10 to result in ground pepper discharged through the grinding opening 20.

The closure unit 3 includes an elongated connecting rod 31, a press component 34, a closure member 33, and a resilient component 32. The connecting rod 31 extends movably through the shaft hole 213 of the coupling shaft 21 along the axis (L), and has opposite top and bottom ends 311, 312 along the axis (L). The closure member 33 is disposed under the grinding unit 2, is secured co-movably to the bottom end 312 of the connecting rod 31, and is formed as a horizontal plate with a diameter equal to that at the discharge end 110 of the container body 11. Movement of the connecting rod 31 along the axis (L) results in corresponding movement of the closure member 33 relative to the grinding unit 2 between a closed position (see FIG. 1) for blocking discharge of the ground pepper through the discharge end 110 of the container body 11, and an opened position (see FIG. 2) for permitting discharge of the ground pepper through the discharge end 110 of the container body 11. The press member 34 is coupled to the top end 311 of the connecting rod 31 and is operable for driving the connecting rod 31 to move the closure member 33 from the closed position to the opened position. The resilient component 32 is retained in the retaining hole 126 of the coupling wall 123 of the cover member 12, is sleeved on the top end 311 of the connecting rod 31, has two ends abutting respectively against the press member 34 and the top shaft portion 211 of the coupling shaft 21, and is disposed to bias the press member 34 and the connecting rod 31 to move in a direction away from the discharge end 110 of the container body 11.

In use, when a force is applied to rotate the cover member 12, the coupling shaft 21 is driven to rotate together with the inner grinding unit 22 relative to the outer grinding unit 23 for grinding the peppercorns in the receiving space 10 to result in ground pepper. Afterward, by pressing the press member 34 against biasing action of the resilient component 32, the closure member 33 is moved from the closed position to the opened position, thereby permitting discharge of the ground pepper through the discharge end 110 of the container body 11.

When the force applied on the press member 34 is removed, the connecting rod 31 and the press member 34 are biased by a restoring force of the resilient component 32 to move in the direction away from the discharge end 110 of the container body 11, thereby driving the closure member 33 to move from the opened position back to the closed position. Therefore, after use, the closure member 33 can effectively prevent residual ground pepper from falling out of the grinding unit 2 via the discharge end 110 of the container body 11.

It should be noted that, while the operating procedure of the peppermill of this embodiment, including rotating the cover member 12 for grinding the peppercorns and operating the press member 34 for moving the closure member 33, is exemplified as two separate steps, the operating procedure should not be limited thereto. For example, a user may rotate the cover member 12 with his fingers while pushing the press member 34 with his palm simultaneously, thereby rotating the cover member 12 and pushing the press member 34 at the same time.

Figure 3:
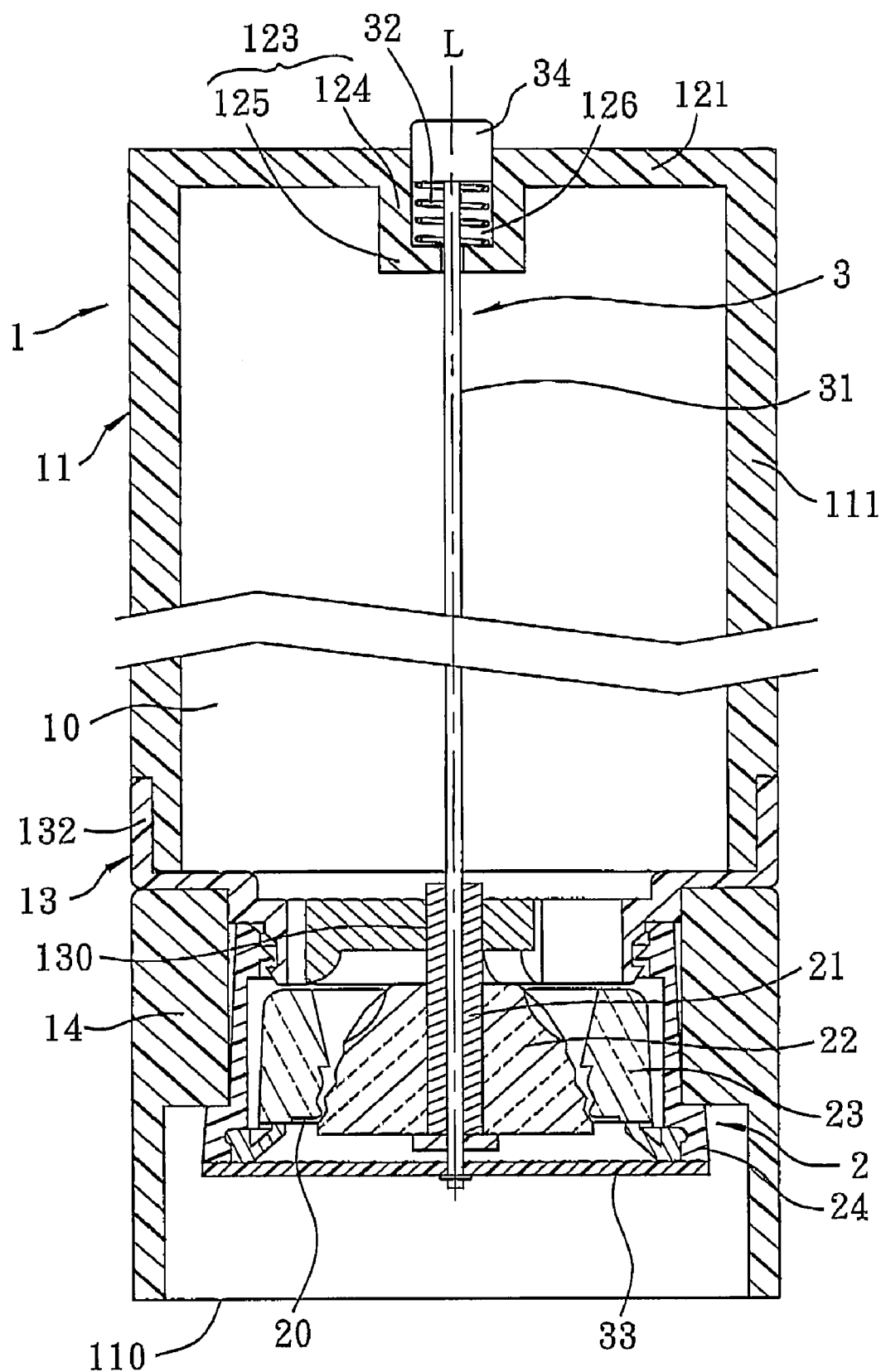
FIG. 3 is a fragmentary sectional view of a second preferred embodiment of the pepper mill according to the invention, illustrating the closure member at the closed position.
Figure 4:
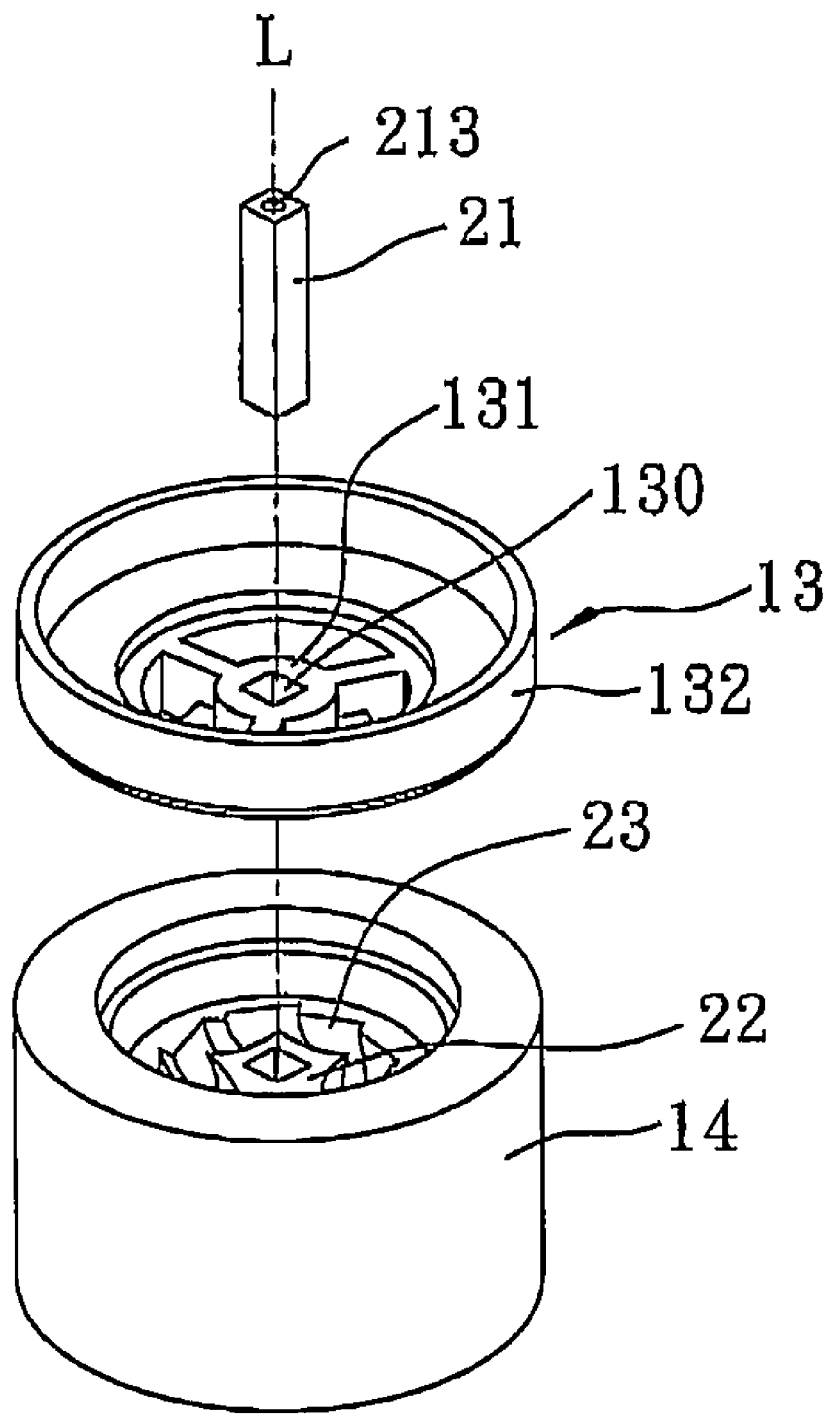
FIG. 4 is a fragmentary exploded perspective view of the second preferred embodiment.
Figure 5:
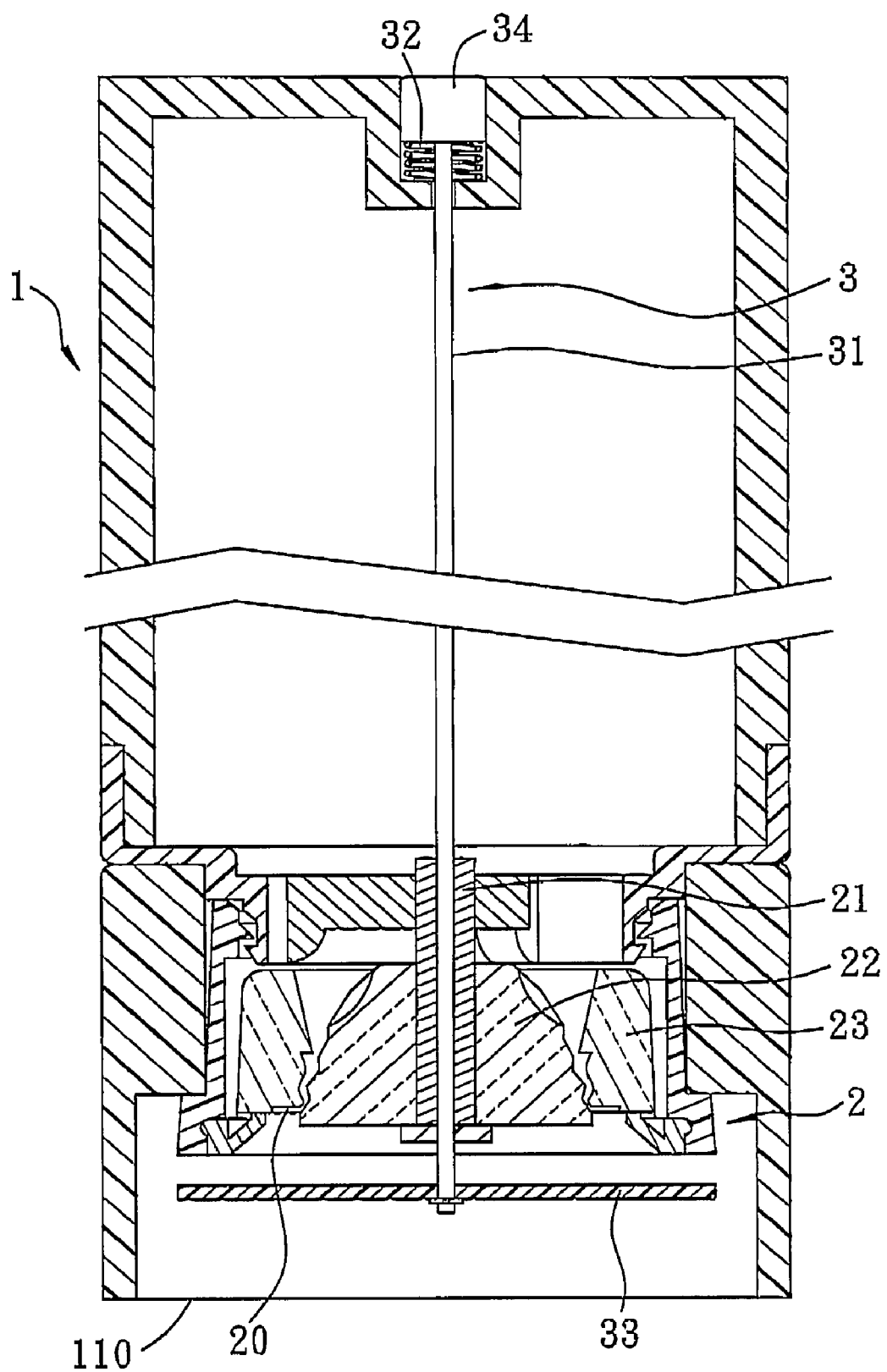
FIG. 5 is a view similar to FIG. 3, but illustrating the closure member at the opened position.

As shown in FIGS. 3 to 5, the second preferred embodiment of the pepper mill according to the present invention has a structure similar to that of the first embodiment. The main difference between this embodiment and the previous embodiment resides in the configurations of the receiving unit 1 and the coupling shaft 21.

In this embodiment, the receiving unit 1 includes a container body 11 surrounding the axis (L) and defining the receiving space 10, a connecting seat 13 coupled co-rotatably to a bottom end of the container body 11, and a stationary end seat 14 connected to the connecting seat 13 and having the discharge end 110.

The container body 11 has a cover wall 121, a surrounding container wall 111 extending parallel to the axis (L) from a periphery of the cover wall 121 and extending in the direction toward the discharge end 110 of the end seat 14, and a stepped coupling wall 123 extending parallel to the axis (L) from the cover wall 121 and extending in the direction toward the discharge end 110 of the end seat 14. The coupling wall 123 has a coupling wall section 124 connected to the cover wall 121, and an abutting wall section 125 extending from the coupling wall section 124 away from the cover wall 121, having an internal diameter smaller than that of the coupling wall section 124, and cooperating with the cover wall 121 and the coupling wall 124 to define a retaining hole 126 for retaining the resilient component 32 of the closure unit 3 therein.

The connecting seat 13 includes an inner surrounding wall 131 surrounding the axis (L) and defining a rectangular shaft coupling hole 130, and an outer surrounding wall 132 surrounding and spaced apart from the inner surrounding wall 131.

In this embodiment, the coupling shaft 21 has a rectangular cross-section, and engages the shaft coupling hole 130 of the connecting seat 13 such that an end thereof is coupled co-rotatably to the connecting seat 13, and an axially opposite end is coupled co-rotatably to the inner grinding seat 22 of the grinding unit 2. The closure member 33 of the closure unit 3 is formed as a horizontal plate with a diameter smaller than that at the discharge end 110 of the end seat 14, such that the closure member 33 blocks the grinding opening 20 in the grinding unit 2 when at the closed position (see FIG. 3).

In use, when a force is applied to rotate the container body 11, the coupling shaft 21 and the connecting seat 13 are driven to rotate relative to the end seat 14, thereby driving the inner grinding unit 22 to rotate relative to the outer grinding unit 23 for grinding the peppercorns in the receiving space 10 to result in ground pepper. Afterward, by pressing the press member 34 against biasing action of the resilient component 32, the closure member 33 is moved by the connecting rod 31 of the closure unit 3 from the closed position to the opened position (see FIG. 5), thereby permitting discharge of the ground pepper through the discharge end 110 of the container body 11. When the force applied on the press member 34 is removed, the closure member 33 is moved from the opened position back to the closed position in the same manner as the previous embodiment. The second preferred embodiment has the same advantages as those of the first preferred embodiment.

It should be further noted that the closure members 33 of the closure units 3 of the abovementioned first and second preferred embodiments are interchangeable as long as the closure member 33 can prevent the ground pepper from falling out of the container body 11 when at the closed position.

Figure 6:
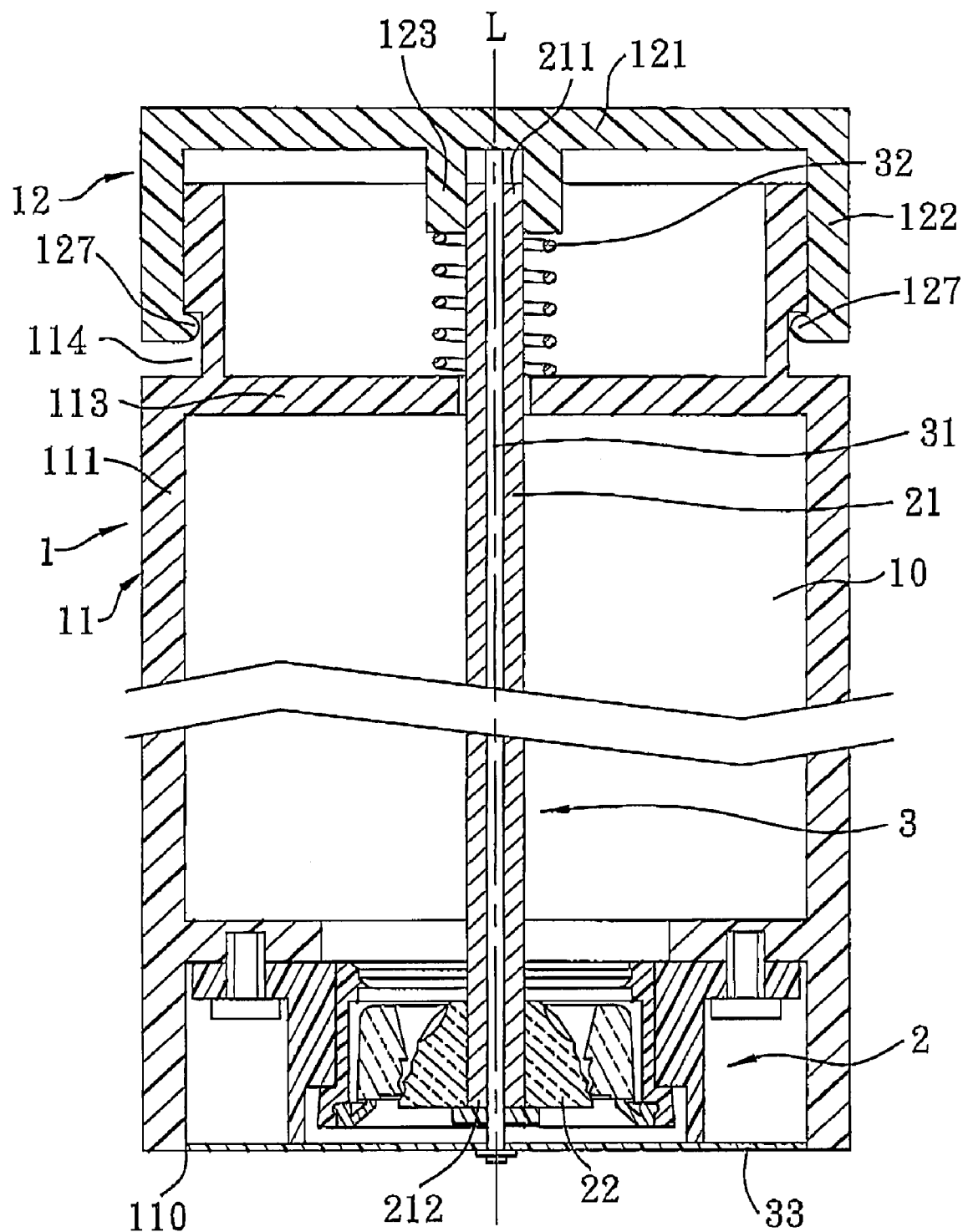
FIG. 6 is a fragmentary sectional view of a third preferred embodiment of the pepper mill according to the invention, illustrating the closure member at the closed position.
Figure 7:
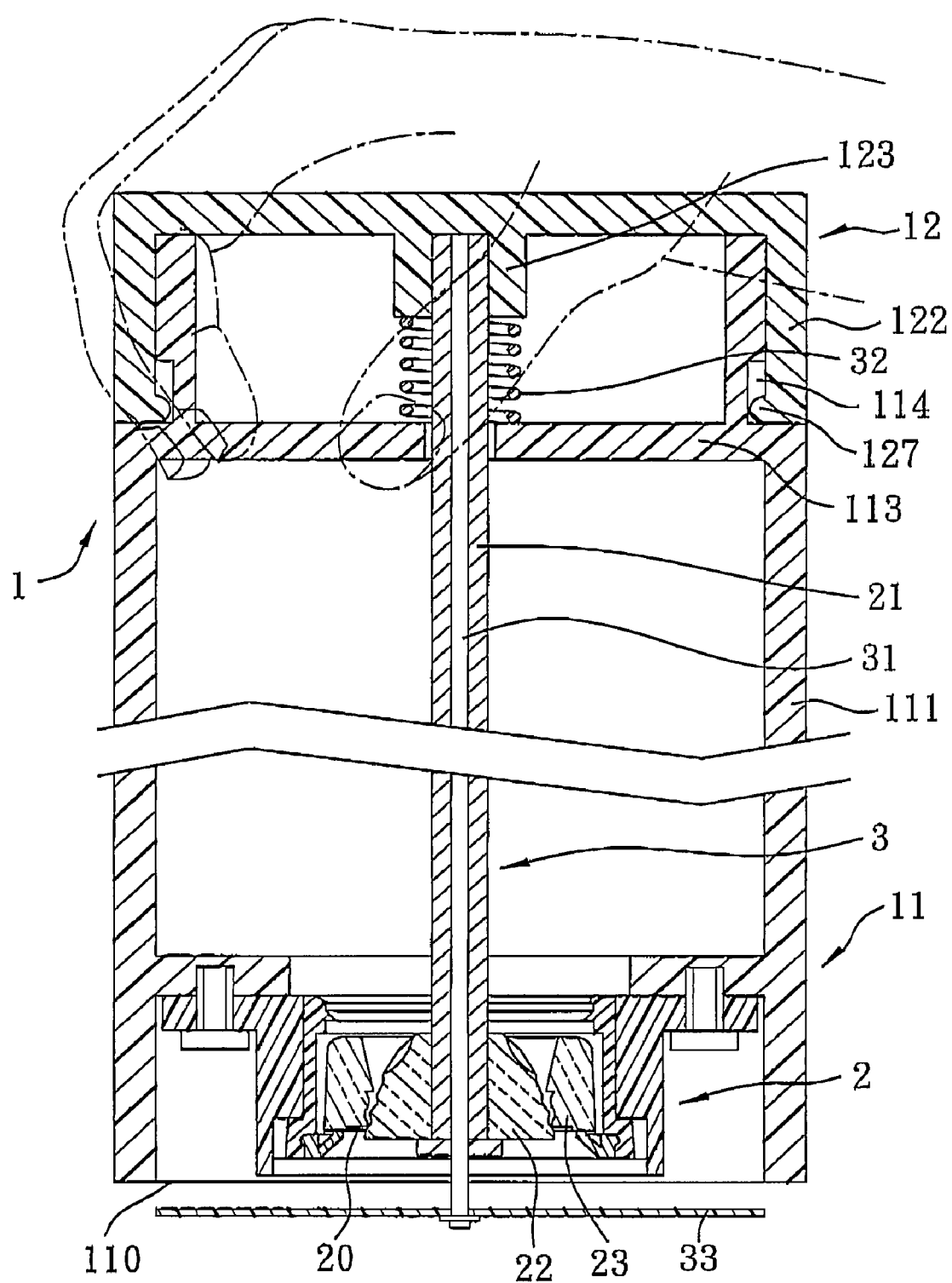
FIG. 7 is a view similar to FIG. 6, but illustrating the closure member at the opened position.

As shown in FIGS. 6 and 7, the third preferred embodiment of the pepper mill according to the present invention has a structure similar to that of the first embodiment. The main difference between this embodiment and the first embodiment resides in the configurations of the container body 11, the cover member 12, and the closure unit 3.

In this embodiment, the container body 11 surrounds the axis (L), defines the receiving space 10, and has the discharge end 110. The container body 11 includes a stepped surrounding container wall 111 surrounding the axis (L), and having a top portion and a bottom portion that has a diameter larger than that of the top portion and that is formed with an annular groove 114. The container body 11 further includes an abutment wall 113 extending radially and inwardly from the surrounding container wall 111.

The cover member 12 is coupled to the container body 11, and includes a cover wall 121, a surrounding wall 122 extending from a periphery of the cover wall 121 and extending in the direction toward the discharge end 110 of the container body 11, and an annular coupling wall 123 extending from the cover wall 121 and extending parallel to the axis (L). The surrounding wall 122 is formed with a pair of angularly spaced apart limiting blocks 127 movably retained in the annular groove 114 such that the cover member 12 is axially and rotatably movable relative to the container body 11.

The coupling shaft 21 of the grinding unit 2 has a top shaft portion 211 extending through the abutment wall 113 and coupled co-rotatably to the coupling wall 123 of the cover member 12, and a bottom shaft portion 212 opposite to the top shaft portion 211 along the axis (L) and coupled co-rotatably to the inner grinding seat 22.

The closure unit 3 includes a connecting rod 31, a closure member 33, and a resilient component 32. The connecting rod 31 extends through the coupling shaft 21 of the grinding unit 2, and has one end coupled to the cover member 12 such that the connecting rod 31 is movable along with the cover member 12 along the axis (L). The closure member 33 is coupled co-movably to the other end of the connecting rod 31. The resilient component 32 has opposite ends abutting respectively against the abutment wall 113 of the container body 11 and the coupling wall 123 of the cover member 12 for biasing the cover member 12 to move in a direction away from the discharge end 110 of the container body 11.

In this embodiment, the cover member 12 is movable between an undepressed position (see FIG. 6), where the limiting blocks 127 abut against a top end of the annular groove 114 opposite to the discharge end 110 of the container body 11, and where the closure member 33 of the closure unit 3 is at the closed position for blocking discharge of the ground pepper through the discharge end 110 of the container body 11, and a depressed position (see FIG. 7), where the closure member 33 is at the opened position for permitting discharge of the ground pepper through the discharge end 110 of the container body 11.

In use, when a force is applied to rotate the cover member 12, the coupling shaft 21 is driven to rotate together with the inner grinding unit 22 relative to the outer grinding unit 23 for grinding the peppercorns in the receiving space 10 to result in ground pepper. At this time, by pressing the cover member 12 against biasing action of the resilient component 32, the closure member 33 is moved by the connecting rod 31 of the closure unit 3 from the closed position to the opened position, thereby permitting discharge of the ground pepper through the discharge end 110 of the container body 11. When the force applied on the cover member 12 is removed, the closure member 33 is moved from the opened position back to the closed position in the same manner as the previous embodiments. The third preferred embodiment has the same advantages as those of the first preferred embodiment.

It should be further noted that the number and configuration of the limiting blocks 127 may vary in other embodiments of this invention as long as the cover member 12 is axially and rotatably movable relative to the container body 11.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:
1. A pepper mill comprising:
a hollow receiving unit surrounding an axis, defining a receiving space for receiving peppercorns, and having a discharge end for discharging ground pepper;
a grinding unit including a coupling shaft that is disposed rotatably in said receiving space and that has a shaft hole extending therethrough along the axis, said grinding unit being operable for grinding the peppercorns in said receiving space to result in the ground pepper; and
a closure unit including
an elongated connecting rod that extends movably through said shaft hole along the axis, and
a closure member that is secured co-movably to
said connecting rod, and that is disposed under said grinding unit, movement of said connecting rod along the axis resulting in corresponding movement of said closure member relative to said grinding unit between a closed position for blocking discharge of the ground pepper through said discharge end of said receiving unit, and an opened position for permitting discharge of the ground pepper through said discharge end of said receiving unit.

2. The pepper mill as claimed in claim 1, wherein:
said closure member of said closure unit is secured co-movably to one end of said connecting rod; and
said closure unit further includes
a press member coupled to the other end of said connecting rod opposite to said closure member, and operable for driving said connecting rod to move said closure member from the closed position to the opened position, and
a resilient component disposed to bias said press member and said connecting rod to move in a direction away from said discharge end of said receiving unit.

3. The pepper mill as claimed in claim 2, wherein said grinding unit further includes an inner grinding seat coupled co-rotatably to said coupling shaft, and a stationary outer grinding seat surrounding said inner grinding seat and cooperating with said inner grinding seat to define a grinding opening therebetween.

4. The pepper mill as claimed in claim 3, wherein said receiving unit further has a cover wall rotatable about the axis, and a stepped coupling wall extending parallel to the axis from said cover wall, extending in the direction toward said discharge end of said receiving unit, and having a coupling wall section that is connected to said cover wall, and an abutting wall section that extends from said coupling wall section away from said cover wall, that has an internal diameter smaller than that of said coupling wall section, and that cooperates with said cover wall and said coupling wall section to define a retaining hole for retaining said resilient component of said closure unit therein.

5. The pepper mill as claimed in claim 4, wherein:
said receiving unit includes
a container body surrounding the axis and having said discharge end, and
a cover member coupled co-rotatably to one end of said container body opposite to said discharge end, having said cover wall and said stepped coupling wall, and cooperating with said container body to define said receiving space;

said coupling shaft of said grinding unit further having a top shaft portion coupled co-rotatably to said coupling wall of said cover member, and a bottom shaft portion coupled co-rotatably to said inner grinding seat of said grinding unit;

rotation of said cover member driving said coupling shaft to rotate together with said inner grinding seat relative to said outer grinding seat for grinding the peppercorns to result in the ground pepper discharged through said grinding opening.

6. The pepper mill as claimed in claim 3, wherein:

said receiving unit includes
- a container body surrounding the axis and defining said receiving space,
- a connecting seat coupled co-rotatably to one end of said container body, and including an inner surrounding wall that surrounds the axis and that defines a shaft coupling hole, and
- a stationary end seat connected to said connecting seat and having said discharge end;

said coupling shaft of said grinding unit engaging said shaft coupling hole of said connecting seat so as to be coupled co-rotatably to said connecting seat;

rotation of said container body and said connecting seat driving said coupling shaft to rotate together with said inner grinding seat relative to said outer grinding seat for grinding the peppercorns to result in the ground pepper discharged through said grinding opening.

7. The pepper mill as claimed in claim 6, wherein said container body has a cover wall, and a stepped coupling wall extending parallel to the axis from said cover wall, extending in the direction toward said discharge end of said receiving unit, and having a coupling wall section that is connected to said cover wall, and an abutting wall section that extends from said coupling wall section away from said cover wall, that has an internal diameter smaller than that of said coupling wall section, and that cooperates with said cover wall and said coupling wall section to define a retaining hole for retaining said resilient component of said closure unit therein.

8. The pepper mill as claimed in claim 1, wherein:

said receiving unit includes
- a container body surrounding the axis, defining said receiving space, and having said discharge end, and
- a cover member coupled to one end of said container body opposite to said discharge end, rotatable about the axis relative to said container body, and movable along the axis relative to said container body;

said coupling shaft being coupled to said cover member so as to be co-rotatable therewith about the axis;

said connecting rod of said closure unit being coupled to said cover member so as to be movable therewith along the axis;

said cover member being movable between an undepressed position, where said closure member of said closure unit is at the closed position, and a depressed position, where said closure member is at the opened position;

said closure unit further including a resilient component disposed to bias said cover member and said connecting rod to move in a direction away from said discharge end of said container body.

9. The pepper mill as claimed in claim 8, wherein:

said cover member of said receiving unit has a cover wall, a surrounding wall extending from a periphery of said cover wall, and a coupling wall extending parallel to the axis from said cover wall, and extending in the direction toward said discharge end of said container body;

said container body further has a surrounding container wall surrounding the axis and coupled to said surrounding wall of said cover member, and an abutment wall extending radially and inwardly from said surrounding container wall;

said resilient component of said closure unit has opposite ends abutting against said abutment wall of said container body and said coupling wall of said cover member, respectively;

said coupling shaft of said grinding unit has a top shaft portion extending through said abutment wall and coupled co-rotatably to said coupling wall of said cover member, and a bottom shaft portion opposite to said top shaft portion along the axis;

said grinding unit further includes an inner grinding seat coupled co-rotatably to said bottom shaft portion of said coupling shaft, and a stationary outer grinding seat surrounding said inner grinding seat and cooperating with said inner grinding seat to define a grinding opening therebetween; and rotation of said cover member drives said coupling shaft to rotate together with said inner grinding seat relative to said outer grinding seat for grinding the peppercorns to result in the ground pepper discharged through said grinding opening.

10. The pepper mill as claimed in claim 9, wherein:

one of said surrounding container wall of said container body and said surrounding wall of said cover member is formed with an annular groove; and the other one of said surrounding container wall of said container body and said surrounding wall of said cover member is formed with a limiting block movably retained in said annular groove such that said cover member is axially and rotatably movable relative to said container body; and said limiting block abuts against a top end of said annular groove opposite to said discharge end of said container body when said cover member is at the undepressed position.

* * * * *